United States Patent
Enomoto et al.

(10) Patent No.: US 7,352,320 B2
(45) Date of Patent: Apr. 1, 2008

(54) FM-CW RADAR

(75) Inventors: Daisuke Enomoto, Hyogo (JP); Yukio Ishikawa, Hyogo (JP)

(73) Assignee: Fujitsu Ten LImited, Kobe-shi (JP)

( * ) Notice: Subject to any disclaimer, the term of this patent is extended or adjusted under 35 U.S.C. 154(b) by 114 days.

(21) Appl. No.: 11/138,346

(22) Filed: May 27, 2005

(65) Prior Publication Data
US 2005/0264439 A1    Dec. 1, 2005

(30) Foreign Application Priority Data
May 31, 2004    (JP)    .............................. 2004-160969

(51) Int. Cl.
G01S 13/58    (2006.01)
G01S 13/00    (2006.01)
G01S 13/08    (2006.01)

(52) U.S. Cl. .......................... 342/70; 342/111; 342/115; 342/117; 342/127; 342/130; 342/134; 342/135

(58) Field of Classification Search ................ 342/104, 342/109, 111, 115, 127, 134, 135, 200–202, 342/82–103, 165–175, 195–197, 70–72, 342/118, 146, 147, 156–158, 128–133, 368–377; 343/844, 711–717, 876; 701/300–301
See application file for complete search history.

(56) References Cited

U.S. PATENT DOCUMENTS

| | | | |
|---|---|---|---|
| 5,541,601 A * | 7/1996 | Goto et al. .................. 341/141 |
| 5,619,208 A * | 4/1997 | Tamatsu et al. .............. 342/70 |
| 5,677,695 A * | 10/1997 | Suzuki et al. ............... 342/109 |
| 5,757,307 A * | 5/1998 | Nakatani et al. .............. 342/70 |
| 5,905,458 A * | 5/1999 | Ashihara ...................... 342/70 |
| 5,963,162 A * | 10/1999 | Mochizuki et al. ........... 342/70 |
| 6,018,363 A * | 1/2000 | Horii ....................... 348/219.1 |
| 6,198,426 B1 * | 3/2001 | Tamatsu et al. .............. 342/70 |
| 6,246,357 B1 * | 6/2001 | Uehara ........................ 342/70 |
| 6,317,073 B1 * | 11/2001 | Tamatsu et al. .............. 342/70 |
| 6,320,531 B1 * | 11/2001 | Tamatsu ..................... 342/109 |
| 6,597,308 B2 * | 7/2003 | Isaji ............................ 342/70 |
| 6,888,494 B2 * | 5/2005 | Tamatsu et al. ............ 342/128 |
| 2002/0190894 A1 | 12/2002 | Mitsumoto et al. |

(Continued)

FOREIGN PATENT DOCUMENTS

| JP | A-05-150035 | 6/1993 |
| JP | A-09-043343 | 2/1997 |
| JP | A-11-190772 | 7/1999 |

Primary Examiner—Thomas H. Tarcza
Assistant Examiner—Hien Ly
(74) Attorney, Agent, or Firm—Oliff & Berridge, PLC (57) ABSTRACT

An FM-CW radar includes a transmitting section, a mixing section, an A/D conversion section, a storage unit, and a signal processing section. The transmitting section transmits a continuous wave frequency-modulated with a triangular wave. The mixing section mixes the continuous wave transmitted and a reflected wave from a target, to generate a beat wave. The A/D conversion section A/D converts the beat wave into digital data. The storage unit includes a first storage section and a second storage section. The signal processing section reads data from the first storage section to process the read data. The A/D conversion section writes the digital data into the second storage section. The control section switches the first storage section and the second storage section alternately in synchronous with switching between up and down of the triangular wave.

9 Claims, 4 Drawing Sheets

U.S. PATENT DOCUMENTS

2003/0016163 A1* 1/2003 Isaji ............................. 342/70
2003/0128156 A1* 7/2003 Kishida ...................... 342/195
2003/0184470 A1* 10/2003 Ishii et al. .................. 342/174
2004/0150550 A1* 8/2004 Shouno et al. ................ 342/70
2005/0007271 A1* 1/2005 Isaji ............................. 342/70
2006/0120331 A1* 6/2006 Ando ......................... 370/335

* cited by examiner

FM-CW RADAR

BACKGROUND OF THE INVENTION

1. Field of the Invention

The invention relates to an FM-CW radar, which is used for preventing collision between moving bodies such as vehicles or adaptive cruise control (following at a fixed distance) of the moving body and which detects a relative velocity for a target existing outside of the moving body and a distance thereto, by means of radar transmitting/receiving.

2. Description of the Related Art

A radar for a vehicle has been desired as a device, which enables collision protection, automatic driving, and the like, from a viewpoint of driving safety and comfort. The FM-CW (frequency-modulated continuous-wave) radar transmits a radio wave with frequency-modulated (FM) at a predetermined cyclic period toward a target, and extracts a beat frequency component between a reflected wave having been reflected by the target and the transmission signal, to thereby obtain a distance to the target and a relative velocity for the target. Since such an FM-CW radar is simple in configuration of a transceiver, and is capable of obtaining a distance to the target and a relative velocity for an object by means of a simple signal processing device, the FM-CW radars are likely to come into extensive use as a radar for vehicles that are required to be compact and inexpensive.

The FM-CW radar is configured to calculate a distance to an object and a relative velocity for the object as follows. The FM-CW radar transmits as a radar wave a transmission signal frequency-modulated by a modulation signal of triangular waveform. The frequency of the transmission signal increases and decreases progressively. The FM-CW radar receives the radar wave having been reflected by a target. The FM-CW radar mixes the received signal with the transmission signal to generate a beat signal, A/D converts the beat signal and stores it in a memory. The FM-CW radar applies fast Fourier transform processing to the thus-stored data in the memory, and calculates the distance to the target and/or the relative velocity for the target from a result of the processing.

However, the calculation of the fast Fourier transform processing requires processing enormous quantity of data while heavily using product-sum operations. Therefore, it is impossible to write an output of the A/D conversion into a memory in process of reading/writing the enormous quantity of processed data. As a result, when a single memory is used for reading/writing the data stemming from the fast Fourier transform by means of a signal processing circuit and for writing the A/D-converted data, it is inevitable to conduct time division for the reading/writing of the data stemming from the fast Fourier transform and for the writing of the data output from the A/D converter. During the course of writing of the A/D converted data, the fast Fourier transform processing is suspended. During the course of the fast Fourier transform processing, the A/D conversion is suspended. As a result, full use of data processing capacity has been inhibited.

In order to solve this problem, JP-A-Hei.9-43343 has proposed providing a pair of memories for storing A/D conversion data alternately; and switching and controlling reading from/writing into the pair of memories in synchronization with calculation period of the fast Fourier transform by the signal processing circuit so that while A/D-converted output is being written into one of the memories, processing data of the signal processing circuit are read from/written into the other memory, thereby enhancing processing efficiency.

SUMMARY OF THE INVENTION

The FM-CW radar according to the related art is provided with two memories as described above, and alternately switches between a memory into which received data are to be written and a memory for use in calculation processing. Start/stop timings of A/D conversion and those timings of sampling are set to timing after the calculation processing and data transfer of calculation results are completed.

However, time period required to transfer the calculation result is greatly affected by the congestion of a bus connected to CPU. Thus, since timing when the transfer of the calculation result ends fails to become constant, it is impossible to maintain intervals between start timings of the A/D conversion. As a result, variations arise in number of calculations, which can be conducted during a predetermined period. Also, time relative to transmission data also fails to become constant. Accordingly, there arises a problem that it is difficult to maintain accuracy in detection of a distance and a relative speed for the target constant.

In view of the above problem, the invention has been made, and provides an FM-CW radar, which maintains intervals between calculation processing constant to enhance accuracy and downsize the radar unit.

According to one embodiment of the invention, an FM-CW radar includes a transmitting section, a mixing section, an A/D conversion section, a storage unit, a signal processing section and a control section. The transmitting section transmits a continuous wave frequency-modulated with a triangular wave. The mixing section mixes the continuous wave transmitted and a reflection wave reflected by a target, to generate a beat wave. The A/D conversion section converts the beat wave into digital data. The storage unit includes a first storage section and a second storage section. The signal processing section reads data from the first storage section to process the read data. The A/D conversion section writes the digital data into the second storage section. The control section switches the first storage section and the second storage section alternately in synchronous with switching between up and down of the triangular wave.

According to this structure, the A/D conversion section converts the beat signal obtained by means of mixing the transmitted wave frequency-modulated by the triangular wave and the reflection wave reflected by the target. Then, the A/D conversion section writes the digital data into the second storage section. The signal processing section performs data processing with using the first storage section. The control section switches the first storage section and the second storage section at a timing when the triangular wave switches between increase (UP) and decrease (DOWN). Accordingly, the A/D conversion and the processing such as fast Fourier transform can be conducted simultaneously and continuously without interruption during the processing. Therefore, it is possible to double the processing efficiency. In addition, since the switching of the triangular wave and the calculation processing are synchronized and intervals between calculation processings are rendered constant, accuracy in detection of a distance to the target and relative velocity for the target can be maintained consistency.

In addition, a data storage section for A/D conversion and a data storage section for calculation are shared by switching between for the purpose of storing the A/D-converted data and for the purpose of calculation processing. Accordingly, as compared with a case where dedicated storage sections are provided for the respective purposes, required memory capacity can be reduced, thereby enabling miniaturization of the circuitry.

According to one embodiment of the invention, the A/D conversion section and the control section may be the same section.

According to one embodiment of the invention, wherein the first storage section and the second storage section may be storage area different from each other.

According to one embodiment of the invention, when the control section performs the switching between the first storage section and the second storage section before the signal processing section completes processing the signal, an error flag may be generated.

When the data storage sections are switched in synchronization with switching between up and down of the triangular wave as described above, the following may occur. That is, in some cases, depending on a congestion status of a bus, transmission of the subsequent triangular wave is started before transfer of a calculation result is completed, and the data storage section, which is still being accessed by the signal processing section, is overwritten by the A/D-converted data. As a result, a question arises about the validity of the calculation result. However, according to the above-described structure, when the control section performs the switching between the first storage section and the second storage section before the signal processing section completes processing the signal, the error flag is generated. Accordingly, transfer of erroneous data on a distance to the target and relative velocity for the target to another control device can be prevented.

According to on embodiment of the invention, the signal processing section may generate the error flag when the control section performs the switching between the first storage section and the second storage section before the signal processing section completes processing the signal.

According to one embodiment of the invention, the control section may control the transmitting section, the mixing section, the A/D conversion section, the storage section, and the signal processing section. The control section may generate the error flag when the control section performs the switching between the first storage section and the second storage section before the signal processing section completes processing the signal.

According to one embodiment of the invention, when the error flag is generated, the storage section may give a priority to writing thereinto the digital data output from the A/D conversion section and keeps the processing.

According to this structure, radar processing can be performed only with use of valid values, and processing associated with the radar can be continued.

DETAILED DESCRIPTION OF THE PREFERRED EMBODIMENTS

Figure 1:
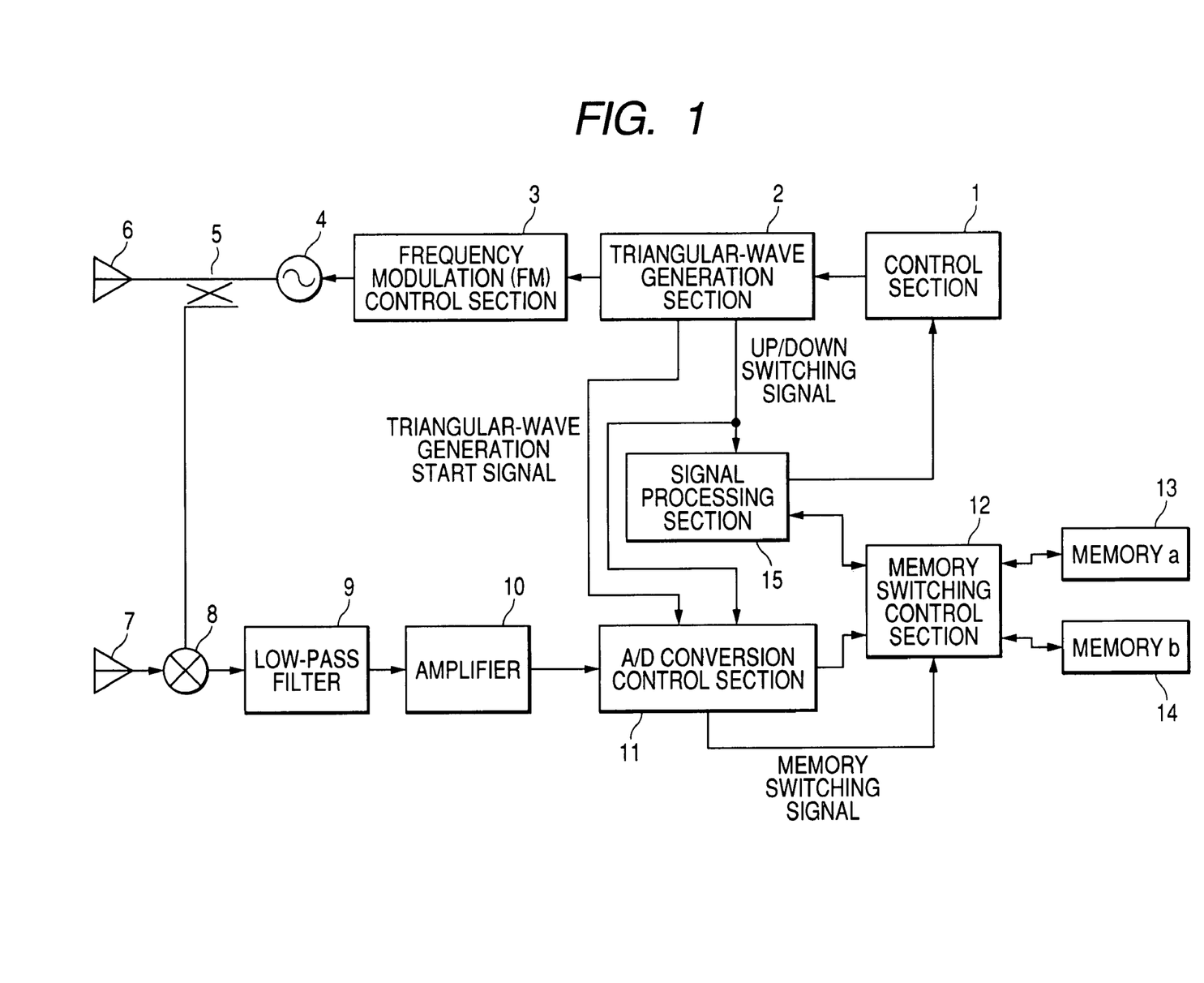
FIG. 1 is a block diagram showing a schematic structure of an FM-CW radar according to an embodiment of the invention.

Hereinbelow, an FM-CW radar according to a first embodiment of the invention will be described by reference to the drawings. FIG. 1 is a schematic block diagram of the FM-CW radar. As shown in FIG. 1, the FM-CW radar includes a control section 1, a triangular-wave generation section 2, a frequency modulation (FM) control section 3, a voltage-controlled oscillator 4, a directional coupler 5, a transmission antenna 6, a receiving antenna 7, a mixer circuit 8, a low-pass filter 9, an amplifier 10, an A/D conversion control section 11, a memory switching control section 12, a memory a 13, a memory b 14, and a signal processing section 15.

Figure 3:
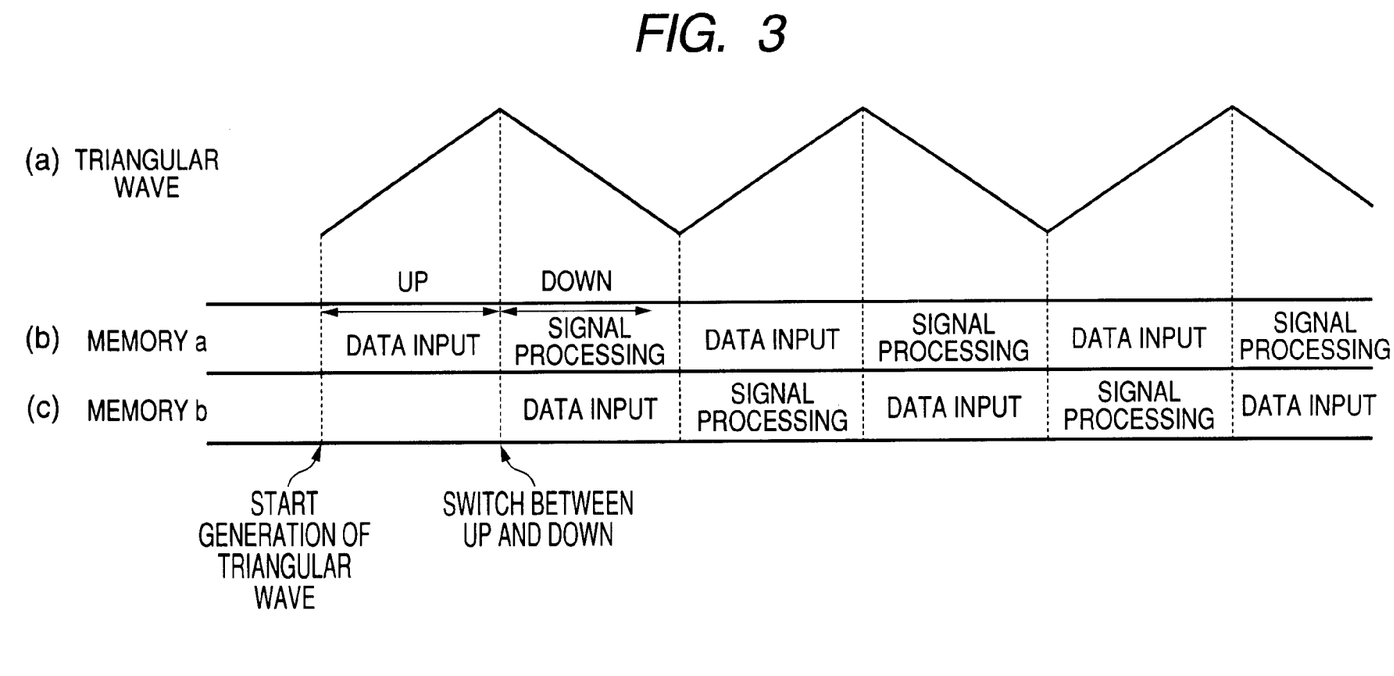
FIG. 3 is a view showing a triangular wave and usage state of a memory under operation.

The control section 1 controls synchronization of the respective sections of the FM-CW radar, and, when the radar starts operation, outputs a command for starting generation of a triangular wave to the triangular-wave generation section 2. The triangular-wave generation section 2 stores data for generating the triangular wave therein in advance. The triangular-wave generation section 2 reads the stored data to generate the triangular wave and inputs the triangular wave to the frequency modulation control section 3. Also, the triangular-wave generation section 2 generates an UP/DOWN switching signal indicating that the triangular wave changes from increase to decrease or from decrease to increase as shown in FIG. 3, in accordance with a read address of the stored data. The triangular-wave generation section 2 transmits a triangular-wave generation start signal and the UP/DOWN switching signal to the A/D conversion control section 11 and to the signal processing section 15.

The frequency modulation control section 3 generates a modulation signal with using the triangular wave transmitted from the triangular-wave generation section 2, and inputs the modulation signal to the voltage controlled oscillator 4. The voltage controlled oscillator 4 modulates a carrier wave in accordance with the modulation signal input by the frequency modulation control section 3, thereby generating a transmission signal frequency-modulated in a triangular-wave manner. The directional coupler 5 branches a part of the transmission signal and transmits the thus-branched signal to the mixer circuit 8. The transmission antenna 6 transmits the transmission wave toward, for instance, a traveling direction of a vehicle in accordance with the transmission signal supplied from the directional coupler 5.

The receiving antenna 7 receives a reflected wave from a vehicle ahead or the like. The mixer circuit 8 mixes the transmission signal having been branched by means of the directional coupler 5 and the received signal having been received by the receiving antenna 7, thereby generating a signal of a beat frequency. The low-pass filter 9 filters the signal and allows a beat frequency component to pass therethrough. The beat frequency component is weak, being of a few mV. Accordingly, the amplifier 10 amplifies the signal, and the thus-amplified beat frequency component is input to the A/D conversion control section 11.

The A/D conversion control section 11 starts A/D conversion processing of outputs from the amplifier 10 in accordance with the triangular-wave generation start signal or the UP/DOWN switching signal output from the triangular-wave generation section 2, and outputs a memory-switching signal to the memory switching control section 12. The memory switching control section 12 switches, between the memory a 13 and the memory b 14, a memory into which digital data output from the A/D conversion control section 11 are to be output in accordance with the memory-switching signal transmitted from the A/D conversion control section 11. In addition, the memory switching control section 12 switches a memory for use in processing by the signal processing section 15 to a memory to which the A/D converted data are not input.

As described above, the memory a 13 and the memory b 14 store digital data output from the A/D conversion control section 11 alternately upon every switching between rising and falling of the triangular wave generated by the triangular generation section 2. In addition, the signal processing section 15 reads data held by one of the memories; specifically, the memory, which is not presently storing the digital data output from the A/D conversion control section 11.

Meanwhile, the signal processing section 15 starts fast Fourier transform processing every time the UP/DOWN switching signal of the triangular wave is input from the triangular-wave generation section 2; sequentially reads necessary data from the memory a 13 or from the memory b 14; conducts processing while overwriting temporary data and a result of calculation on the same memory; and when the processing is completed, transfers the processing result to the control section 1. In addition, in a case where UP/DOWN of the triangular wave is switched before completion of the processing, the signal processing section 15 outputs an error flag signal to the control section 1.

Figure 2:
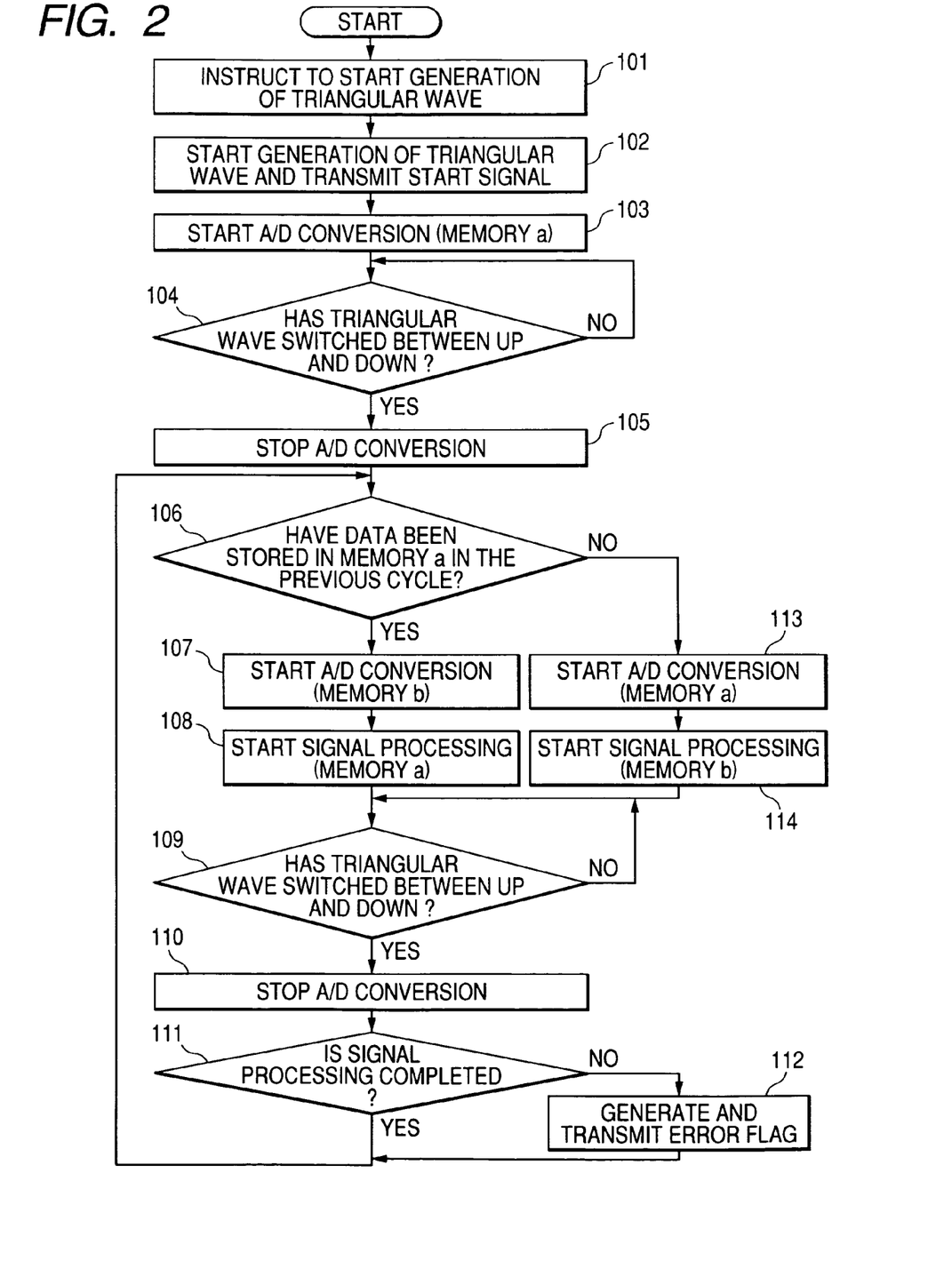
FIG. 2 is a flowchart showing operations of the FM-CW radar.

Next, the operations of the FM-CW radar shown in FIG. 1 will be described by reference to a flowchart shown in FIG. 2 and an operation diagram shown in FIG. 3.

When the FM-CW radar starts operation, the control section 1 issues to the triangular-wave generation section 2 a command to start generation of a triangular wave (step 101). Accordingly, the triangular-wave generation section 2 starts generation of a triangular wave as shown in (a) of FIG. 3, supplies the thus-generated triangular wave to the frequency modulation control section 3, and outputs a triangular-wave generation start signal to the A/D conversion control section 11 (step 102).

Upon the triangular wave input from the triangular-wave generation section 2, the frequency modulation control section 3 generates a frequency modulation signal, and supplies the signal to the voltage controlled oscillator 4. The voltage controlled oscillator 4 generates a transmission wave frequency-modulated in a triangular wave manner, and transmits the transmission wave from the transmission antenna 6 by way of the directional coupler 5. When the receiving antenna receives a reflected FM-CW wave having been reflected by a target such as a vehicle ahead, the received wave is input to the mixer circuit 8. The received wave is mixed with the transmission wave output from the directional coupler 5, and a generated beat signal is extracted by means of the low-pass filter 9. The beat signal is input to the A/D conversion control section 11 by way of the amplifier 10.

Meanwhile, upon receipt of the triangular-wave generation start signal from the triangular-wave generation section 2, the A/D conversion control section 11 starts A/D conversion processing of an output from the amplifier 10. In addition, the A/D conversion control section 11 outputs the memory switching signal to the memory switching control section 12 to control the memory switching control section 12 so as to store the A/D converted digital data in the memory a 13. Accordingly, as shown in (b) of FIG. 3, data obtained by means of A/D conversion of the beat signal are stored in the memory a 13 (step 103).

During the course of the A/D conversion, the A/D conversion control section 11 determines as to whether or not the UP/DOWN switching signal has been input from the triangular-wave generation section 2 (step 104). When the triangular-wave generation section 2 switches UP/DOWN of the triangular wave, the A/D conversion control section 11 stops the A/D conversion processing (step 105). Next, the A/D conversion control section 11 determines as to whether or not A/D converted data have been stored in the memory a 13 in the previous cycle (step 106). When A/D converted data have been stored in the memory a 13 in the previous cycle, the A/D conversion control section 11 outputs a memory-switching signal to the memory switching control section 12 so as to switch a state into another state where digital data having been subjected to A/D conversion are stored in the memory b 14, reading/writing of data between the memory a 13 and the signal processing section 15 are enabled, and A/D conversion processing is started (step 107).

Concurrent with the above, the triangular-wave generation section 2 inputs an UP/DOWN switching signal to the signal processing section 15. The signal processing section 15 starts processing such as fast Fourier transform processing; reads/writes the processing data stemming from product-sum operations from/into the memory a 13 to thereby overwrite temporary data and the calculation result into an area of the memory a 13 from which the digital data has already been read (step 108). During the course of the processing, the signal processing section 15 sequentially transfers the processing result to the control section 1. The control section 1 calculates a distance to the target and a relative velocity for the target on the basis of the result of the fast Fourier transform processing and the like.

Here, during a period from reflection by the target of the transmission wave having been transmitted from the transmission antenna 6 to receipt of the same by way of the receiving antenna 7, the transmission wave from the transmission antenna 6 is delayed by an amount proportional to the distance to the target. In addition, the transmission wave is subjected to Doppler shift by an amount proportional to the relative velocity. However, since the transmission wave has been modulated with the triangular wave, the distance to the target and the relative velocity for the target are obtained as a base-band frequency component. Accordingly, the beat frequency of the transmission/reception wave, which is generated by the mixer section 8 by means of mixing the received signal with the signal transmitted from the directional coupler 5, corresponds to a sum of a frequency depending on the distance to the target and a frequency of depending on the relative velocity for the target and a difference between these frequencies, respectively.

As described above, in a case where a triangular wave is used as a modulation signal, when a target approaches, at an interval where the triangular wave is ascending (i.e., where the frequency increases), a sum of a frequency corresponding to a distance to a target and a frequency corresponding to a relative velocity for a target becomes a beat frequency. In contrast, at an interval where the triangular wave is descending (i.e., where the frequency decreases), a difference between the frequency corresponding to a distance to a target and the frequency corresponding to a relative velocity for a target becomes a beat frequency. Therefore, when the signal processing 15 detects these frequencies and transmits the frequencies to the control section 1, the control section 1 can calculate a distance to the target and a relative velocity for the target from the sum and difference of the frequencies.

Meanwhile, during the course of the A/D conversion and the signal processing, the A/D conversion control section 11 and the signal-processing section 15 determines as to whether or not an UP/DOWN switching signal has been input from the triangular-wave generation section 2 (step 109). Upon receiving the UP/DOWN switching signal from the triangular-wave generation section 2, the A/D conversion control section 11 stops A/D conversion processing (step 110). Meanwhile, the signal processing section 15 determines as to whether or not the signal processing is completed (step 111). When the signal processing is not completed, the signal processing section 15 generates an error flag and transfers the error flag to the control section 1, thereby preventing calculation with using error data (step 112).

More specifically, when UP/DOWN switching of the triangular waves occurs due to cycle of the triangular wave and the occupied state of the bus before transfer of the processing result to the control section 1 is completed, the calculation result on the memory, which is being used by the signal processing section 15 is overwritten with the subsequent A/D-converted data. Therefore, in such a case the error flag is output, thereby notifying the control section 1 that the wrong data have been transferred. Meanwhile, after occurrence of the error, writing of the A/D converted data into the memory is prioritized, and the calculation processing in the signal processing section 15 is suspended.

In addition, when in step 111 it is concluded that the processing is completed, or when an error flag is output in step 111, processing returns to step 106, thereby starting a new A/D conversion processing and new signal processing.

Meanwhile, in step 106, when the A/D conversion control section 11 concludes that the A/D-converted data have been stored in the memory b 14 in the previous cycle, the A/D conversion control section 11 outputs a memory-switching signal to the memory switching control section 12 so as to switch a state to another state where the digital data having been subjected to A/D conversion is stored into the memory a 13; the signal processing section 15 can read/write data from/into the memory a 13; and A/D conversion processing is started (step 113).

Concurrent with the above, the signal processing section 15 starts fast Fourier transform processing and the like while reading/writing the processing data from/into the memory b 14 (step 114). As described above, when the A/D conversion and the signal processing are started, processing proceeds to step 109 where the A/D conversion control section 11 and the signal processing section 15 determines as to whether or not an UP/DOWN switching signal has been input from the triangular-wave generation section 2.

Meanwhile, when operations of the radar unit are stopped, the control section 1 controls the respective sections and stops the operations shown in the flowchart.

As described above, the beat signal, which is obtained by means of mixing the transmission wave frequency-modulated with the triangular wave and the reflection wave from the target, is subjected to A/D conversion by means of the A/D conversion control section 11. The resultant beat signal is written into one of the memories, and data processing is performed by use of the other memory and the signal processing section 15. Switching between the memories is performed in accordance with UP/DOWN-switching timing of the triangular wave to be transmitted. Accordingly, the processing efficiency is enhanced, and intervals between data processing are rendered constant. In addition, since the processing data are synchronized with the transmission signal, accuracy in detection of the distance and speed can be maintained constant.

Meanwhile, in the first embodiment, switching between the memory into which the A/D-converted data is stored and the memory for use in signal processing is performed by means of the A/D conversion control section 11 controlling the memory switching control section 12. However, when the control section 1 monitors the triangular-wave generation start signal and the UP/DOWN switching signal output from the triangular-wave generation section 2, the control section 1 can switch between the memories.

In addition, in the embodiment, the error signal is generated by the signal processing section 15. However, similar to the above, in a case where the control section 1 monitors the UP/DOWN switching signal output from the triangular-wave generation section 2, and where UP/DOWN of the triangular wave is switched before completion of transfer of the processing result from the signal processing section 15, the control section 1 may generate the error flag.

Furthermore, the embodiment has been described as a case where the FM-CW radar of the invention is applied to a radar for a vehicle. However, the FM-CW radar of the invention can be applied to a variety of uses other than for a vehicle.

Modified Embodiment

A modified embodiment of the invention will be described below. The preceding embodiment described above does not mention about how many A/D converters are used in the A/D conversion control section 11. The A/D conversion control section 11 of the preceding embodiment may include, for example, a single A/D converter. In order to speed up of the A/D conversion processing, the inventors conceive that either (a) speeding up an A/D converter (IC) performing the A/D conversion or (b) using two or more A/D converters (ICs). The modified embodiment relates to the latter. Specifically, the A/D conversion control section 11 according to the modified embodiment includes an A/D controller 11a and two A/D converters (the A/D converter-A 11b and the A/D converter-B 11c). Also, the FM-CW radar shown in FIG. 4 further includes a memory c 101 connected between the signal processing section 15 and the control section 1.

Figure 4:
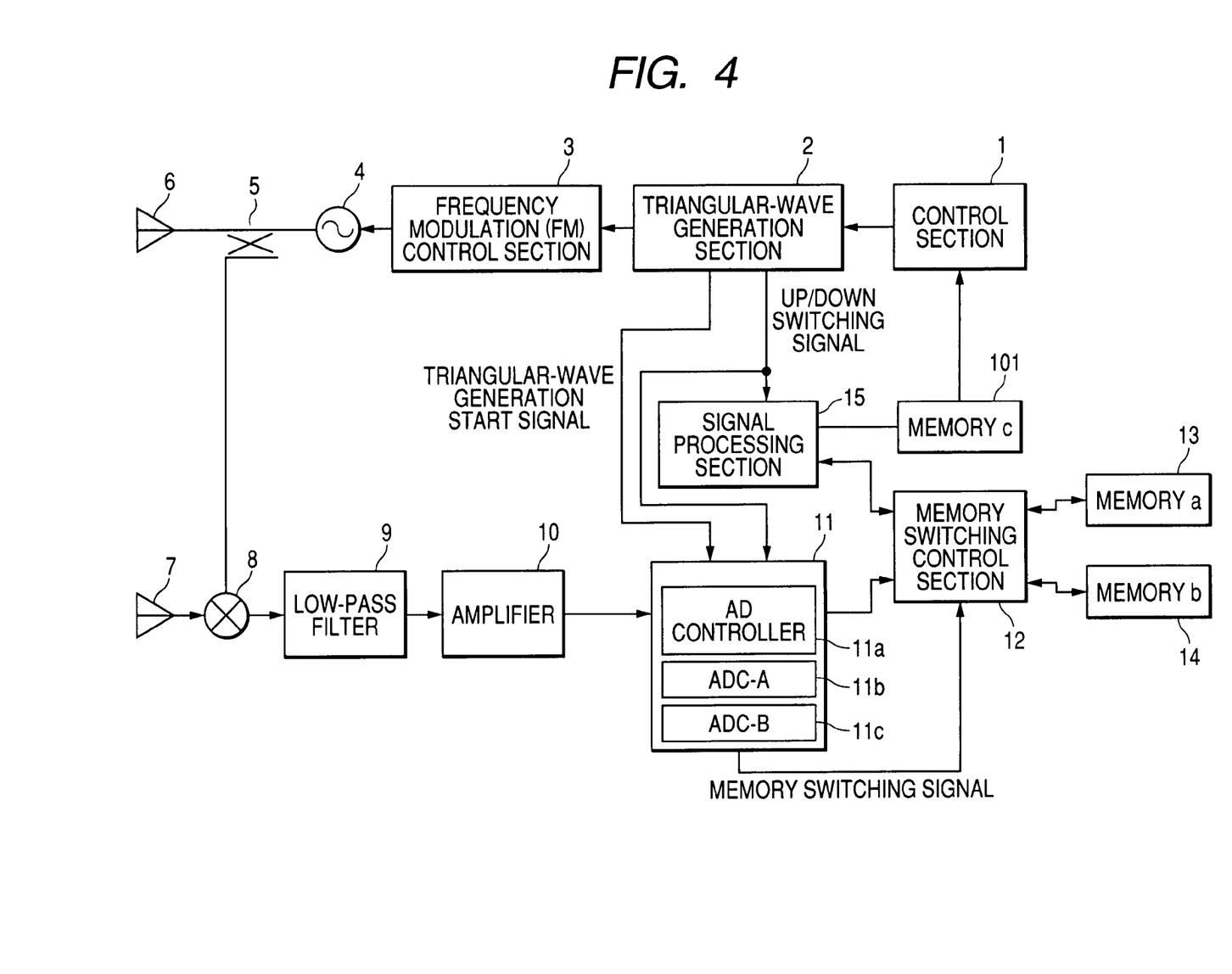
FIG. 4 is a block diagram showing a schematic structure of an FM-CW radar according to a modified embodiment of the invention.

The A/D controller 11a controls the A/D converters 11b and 11c to A/D converts the signals input from the amplifier 10 in conjunction with each other. When the A/D conversion control section 11 writes digital data into the memory a 13 or the memory b 14, the A/D controller 11a outputs digital data converted by the A/D converter-A 11b and/or A/D converter-B 11c, to the memory switching control section 12.

When the signal processing section 15 concludes that the signal processing is completed as in the step 111, the signal processing section 15 reads the calculation result having been stored in the memory a 13 or the memory b 14 and then writes the read calculation result (result of the fast Fourier transform) into the memory c 101. Thereafter, the control section 1 reads the calculation result from the memory c 101 at an appropriate timing to calculate a distance to a target and/or a relative velocity for the target.

Other components of the FM-CW radar of the modified embodiment operate similarly to those of the preceding embodiment. Therefore, duplicate description is omitted here.

What is claimed is:

1. An FM-CW radar comprising:
   a transmitting section operable to transmit a continuous wave frequency-modulated with a triangular wave;
   a mixing section operable to mix the continuous wave transmitted and a reflected wave of the continuous wave, which is reflected from a target, to generate a beat wave;
   an A/D conversion section operable to A/D convert the beat wave into digital data;
   a storage unit including a first storage section and a second storage section, each of the first storage section and the second storage section being operable to store the digital data;
   a signal processing section operable to process the digital data stored in the first storage section and the second storage section; and a control section operable to switch a storage section storing the digital data A/D converted by the A/D conversion section between the first storage section and the second storage section in synchronization with switching between up and down of the triangular wave, wherein the control section is operable to switch a storage section which stores the digital data processed by the signal processing section to a storage section which is different from the storage section storing the digital data A/D converted by the A/D conversion section in synchronization with the switching between up and down of the triangular wave.

2. The FM-CW radar according to claim 1, wherein the first storage section and the second storage section are storage areas different from each other.

3. The FM-CW radar according to claim 1, wherein the A/D conversion section and the control section are the same section.

4. The FM-CW radar according to claim 1, wherein the control section controls the transmitting section, the mixing section, the A/D conversion section, the storage unit, and the signal processing section.

5. The FM-CW radar according to claim 1, wherein when the control section switches the storage section storing the digital data A/D converted by the A/D conversion section between the first storage section and the second storage section before the signal processing section completely processes the digital signal stored in one of the first storage section and the second storage section, an error flag is generated.

6. The FM-CW radar according to claim 5, wherein the signal processing section generates the error flag.

7. The FM-CW radar according to claim 5, wherein:

the control section controls the transmitting section, the mixing section, the A/D conversion section, the storage unit, and the signal processing section; and the control section generates the error flag.

8. The FM-CW radar according to claim 5, wherein when the error flag is generated, the storage unit gives a priority to storing the digital data in the storage unit over processing the digital data by the signal processing section.

9. The FM-CW radar according to claim 1, wherein:

the A/D conversion section comprises a plurality of A/D converters and an A/D controller; and the A/D controller controls the A/D converters to A/D convert the beat wave into the digital signal in conjunction with each other.

* * * * *